United States Patent
Xu

(10) Patent No.: US 12,475,266 B2
(45) Date of Patent: Nov. 18, 2025

(54) KEY MANAGEMENT METHOD, DATA PROTECTION METHOD, SYSTEM, CHIP, AND COMPUTER DEVICE

(71) Applicant: CHENGDU HAIGUANG INTEGRATED CIRCUIT DESIGN CO., LTD., Sichuan (CN)

(72) Inventor: Xiangjun Xu, Sichuan (CN)

(73) Assignee: CHENGDU HAIGUANG INTEGRATED CIRCUIT DESIGN CO., LTD. (CN)

( * ) Notice: Subject to any disclaimer, the term of this patent is extended or adjusted under 35 U.S.C. 154(b) by 0 days.

(21) Appl. No.: 18/695,172

(22) PCT Filed: Sep. 1, 2023

(86) PCT No.: PCT/CN2023/116419
§ 371 (c)(1),
(2) Date: Mar. 25, 2024

(87) PCT Pub. No.: WO2024/119918
PCT Pub. Date: Jun. 13, 2024

(65) Prior Publication Data
US 2025/0124176 A1 Apr. 17, 2025

(30) Foreign Application Priority Data
Dec. 7, 2022 (CN) .......................... 202211566306.4

(51) Int. Cl.
*G06F 21/79* (2013.01)
*G06F 21/72* (2013.01)
*G06F 21/78* (2013.01)

(52) U.S. Cl.
CPC .............. *G06F 21/79* (2013.01); *G06F 21/72* (2013.01)

(58) Field of Classification Search
CPC ........... G06F 21/79; G06F 21/72; G06F 21/78
See application file for complete search history.

(56) References Cited

U.S. PATENT DOCUMENTS

| | | | |
|---|---|---|---|
| 11,816,228 B2 * | 11/2023 | Matthews, Jr. | G06F 21/602 |
| 12,086,424 B2 * | 9/2024 | Shanbhogue | G06F 9/5016 |
| 12,314,386 B2 * | 5/2025 | Orlando | G06F 21/554 |

(Continued)

FOREIGN PATENT DOCUMENTS

| | | |
|---|---|---|
| CN | 105426786 A | 3/2016 |
| CN | 116011041 A | 4/2023 |

*Primary Examiner* — Amie C. Lin
(74) *Attorney, Agent, or Firm* — Fox Rothschild LLP

(57) ABSTRACT

Embodiments of the present disclosure provide a key management method, a data protection method, a system, a chip, and a computer device, and the key management method includes: determining a plurality of memory regions that need to be encrypted and protected in a memory and a memory protocol of each memory region; determining, for each CXL memory region, a device identification and address information of the CXL memory region; generating protection key generation information of the CXL memory region; according to the device identification and the address information of the CXL memory region; generating a protection key of the CXL memory region according to a system root key predetermined and the protection key generation information of the CXL memory region.

17 Claims, 4 Drawing Sheets

(56) References Cited

U.S. PATENT DOCUMENTS

2009/0245522 A1* 10/2009 Kudo .................... H04L 9/0894
380/280
2021/0034791 A1 2/2021 Singh et al.

* cited by examiner

KEY MANAGEMENT METHOD, DATA PROTECTION METHOD, SYSTEM, CHIP, AND COMPUTER DEVICE

CROSS-REFERENCE TO RELATED APPLICATION

The present application claims priority to International Patent Application No. PCT/CN2023/116419 filed Sep. 1, 2023, which claims priority to Chinese Patent Application No. 202211566306.4, filed on Dec. 7, 2022, the disclosures of which are incorporated herein by reference in their entirety as part of the present application.

TECHNICAL FIELD

Embodiments of the present disclosure relate to a key management method, a data protection method, a system, a chip, and a computer device.

BACKGROUND

With the development of integrated circuits and the improvement of processes, the data computation and memory capacity of chips have been dramatically improved. There are data that need to be encrypted and protected in all kinds of information and data processed by chips, so it is especially important to study the data encryption and protection solution of chips.

Currently, computer systems applying chips are mainly designed with von architecture, i.e., data computation and data memory are separated from each other; for example, data are generally stored in a memory external to the chip.

The memory realizes data memory mainly based on a memory protocol, and with the emergence of the Compute Express Link (CXL) memory protocol, the memory can be flexibly configured via the CXL memory protocol, thereby enhancing the flexibility and scalability of data memory. In this context, how to provide a basis for enhancing the data memory security of the CXL memory protocol has become a technical problem that needs to be solved by those skilled in the art.

SUMMARY

In view of this case, the embodiments of the present disclosure provides a key management method, a data protection method, a system, a chip and a computer device, which can generate the data key for data encryption and decryption for the CXL memory region, and generate an independent protection key for protecting the data key for the CXL memory region, so as to encrypt and protect the data key of the CXL memory region through the independent protection key of the CXL memory region, and to enhance the security of the data key of the CXL memory region; and thus, it is able to provide a technical basis for the use of the data key of the CXL memory region to protect the data security of the CXL memory region, and provide a technical basis for enhancing the data memory security performance of the CXL memory protocol.

In order to achieve the above purpose, the embodiment of the present disclosure provides the following technical scheme.

In a first aspect, an embodiment of the present disclosure provides a key management method, applied to a key manager, the method comprises:

determining a plurality of memory regions that need to be encrypted and protected in a memory and a memory protocol of each memory region, wherein the plurality of memory regions comprise at least one Compute Express Link (CXL) memory region based on a CXL memory protocol;

determining, for each CXL memory region, a device identification and address information of the CXL memory region; generating protection key generation information of the CXL memory region according to the device identification and the address information of the CXL memory region; generating a protection key of the CXL memory region according to a system root key predetermined and the protection key generation information of the CXL memory region;

generating, for each CXL memory region, a random number for the CXL memory region; and generating a data key of the CXL memory region according to the random number of the CXL memory region, the data key of the CXL memory region is used for encrypting and decrypting data of the CXL memory region, and the protection key of the CXL memory region is used for encrypting and protecting the data key of the CXL memory region.

In a second aspect, an embodiment of the present disclosure provides a data protection method, applied to a CXL memory controller, which comprises:

acquiring a data processing request, wherein the data processing request indicates that data processing is performed on a target CXL memory region;

determining a data key of the target CXL memory region from data keys configured by the CXL memory controller, wherein the CXL memory controller is configured with a data key of each CXL memory region, and the data key of the CXL memory region is generated based on the key management method according to any one of claims 1-13 and configured in the CXL memory controller; and processing data in the target CXL memory region according to the data key determined.

In a third aspect, an embodiment of the present disclosure provides a computer system, which comprises a key manager, wherein the key manager comprises a master control unit, a first algorithm engine, and a random number engine;

the master control unit is configured to: determine a plurality of memory regions that need to be encrypted and protected in a memory and a memory protocol of each memory region, wherein the plurality of memory regions comprise at least one Compute Express Link (CXL) memory region based on a CXL memory protocol; determine, for each CXL memory region, a device identification and address information of the CXL memory region; generate protection key generation information of the CXL memory region according to the device identification and the address information of the CXL memory region; invoke the first algorithm engine to generate a protection key of the CXL memory region according to a system root key predetermined and the protection key generation information of the CXL memory region;

invoke, for each CXL memory region, the random number engine to generate a random number of the CXL memory region; and generate a data key of the CXL memory region according to the random number of the CXL memory region, wherein the data key of the CXL memory region is used for encrypting and decrypting data of the CXL memory region, and the protection key of the CXL memory region is used for encrypting and protecting the data key of the CXL memory region;

the random number engine is configured to, invoked by the master control unit, generate a random number for each CXL memory region; and the first algorithm engine is configured to, invoked by the master control unit, to process a result of splicing the system root key and the protection key generation information of the CXL memory region by a hash algorithm to obtain the protection key of the CXL memory region.

In a fourth aspect, an embodiment of the present disclosure provides a chip, comprising the computer system as described in the third aspect.

In a fifth aspect, an embodiment of the present disclosure provides a computer device, comprising the chip as described in the fourth aspect.

The key management method provided by the embodiments of the present disclosure can generate a data key used for encrypting and decrypting data for the CXL memory region, and generate an independent protection key for protecting the data key for the CXL memory region; and because device identifications and address information of different CXL memory regions are different, when each CXL memory region generates protection key generation information based on its own device identification and address information, each CXL memory region has independent protection key generation information. Therefore, based on the independent protection key generation information of each CXL memory region, the embodiments of the present disclosure can enable the protection keys of different CXL memory regions to be different (that is, the protection key of each CXL memory region is independent) when the protection key is generated based on the system root key and the protection key generation information of the CXL memory region; and then the independent protection key of the CXL memory region is used to encrypt and protect the data key of the CXL memory region, which can ensure the security of the data key used for data encryption and decryption in the CXL memory region while realizing the scalability of the CXL memory protocol; in addition, the data key in the CXL memory region is generated through a random number, so the data key of the CXL memory region is not related to the system root key, which can effectively avoid the risk of the system root key being cracked due to the data key being cracked, thereby enhancing the security of the computer system.

The embodiments of the present disclosure generate the data key for data encryption and decryption for the CXL memory region, and generate an independent protection key for protecting the data key for the CXL memory region, so that the data key of the CXL memory region is encrypted and protected through the independent protection key of the CXL memory region, which enhances the security of the data key of the CXL memory region; furthermore, it can provide a technical basis for the subsequent use of the data key for the security of the CXL memory region to protect the data security of the CXL memory region, and it can provide a technical basis for enhancing the data memory security performance of the CXL memory protocol.

BRIEF DESCRIPTION OF DRAWINGS

In order to more clearly illustrate the technical solutions in the embodiments of the present disclosure, the drawings that need to be used in the embodiments will be briefly described in the following. Apparently, the drawings in the following description are only some embodiments of the present disclosure. For those skilled in the art, other drawings can also be obtained based on these drawings without any inventive work.

DETAILED DESCRIPTION

The technical solutions in the embodiments of the present disclosure will be described in a clearly and fully understandable way in conjunction with the drawings. Apparently, the described embodiments are only a part but not all of the embodiments of the present disclosure. Based on the embodiments of the present disclosure, those ordinarily skilled in the art can acquire other embodiment(s), without any inventive work, which should be within the scope of the present disclosure.

Figure 1:
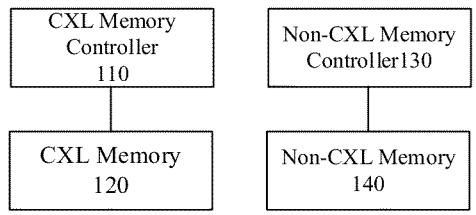
FIG. 1 is an example diagram of the architecture of a computer system.

With the introduction of a CXL memory protocol, the memory protocol for a memory in a computer system may be mainly categorized into a CXL memory protocol, and a non-CXL memory protocol such as Double Data Rat (DDR), Graphics Double Data Rate (GDDR), High Bandwidth Memory (HBM), and the like. Based on the CXL memory protocol, a CXL memory and a corresponding CXL memory controller may be set in the computer system to realize data memory in the CXL memory through the CXL memory protocol; and based on the non-CXL memory protocol, a non-CXL memory and a corresponding non-CXL memory controller may be set in the computer system to realize data memory in the non-CXL memory through the non-CXL memory protocol. For ease of understanding, FIG. 1 exemplarily illustrates an example diagram of an architecture of a computer system, as shown in FIG. 1, the computer system may include a CXL memory controller 110, a CXL memory 120, a non-CXL memory controller 130, and a non-CXL memory 140.

The CXL memory controller 110 may be a memory controller based on the CXL memory protocol for implementing memory control of data in the CXL memory 120; and the CXL memory 120 may be a memory based on the CXL memory protocol. It should be noted that one CXL memory controller may control and manage one or more CXL memories; a plurality of CXL memory regions may be set in one CXL memory, or it may be that a plurality of CXL memories are set corresponding to one CXL memory region, which may be determined by system configuration; and one CXL memory region may be considered as a continuous CXL memory space used to store data at a system address.

The non-CXL memory controller 130 may be a memory controller based on the non-CXL memory protocol for implementing memory control of data in the non-CXL memory 140; and the non-CXL memory 140 may be a memory based on the non-CXL memory protocol. In one example, the non-CXL memory controller is, for example, a memory controller, and the non-CXL memory is, for example, a memory. It should be noted that one non-CXL memory controller may control and manage one or more non-CXL memories (e.g., one memory controller may manage and control one or more physical memories); a plurality of non-CXL memory regions may be set in one non-CXL memory, or it may be that a plurality of non-CXL memories are set corresponding to one non-CXL memory region, which may be determined by the system configuration; and one non-CXL memory region may be considered as a continuous non-CXL memory space used to store data at a system address.

For non-CXL memory protocols such as DDR, to ensure data memory security, the non-CXL memory controller can encrypt data when storing the data into the non-CXL memory, and decrypt the data when the data need to be read from the non-CXL memory. However, although the CXL memory protocol defines the IDE (Integrity and Data Encryption) function, the CXL memory protocol supports data encryption and protection when data is transmitted between communication links of CXL devices; for the data stored in the CXL memory, the CXL memory protocol does not support data encryption and protection, and therefore an attacker is still able to directly acquire plaintext data in the CXL memory through various methods, resulting in a security risk for the data stored in the CXL memory.

Based on the flexible features of the CXL memory protocol such as scalability and hot-swappable support, the CXL memory protocol has a wide range of application scenarios in the field of data memory, so it is particularly important to make technical improvements to the CXL memory protocol to provide a basis for enhancing the data memory security performance of the CXL memory protocol.

Based on this, the embodiments of the present disclosure provide a key management method applicable to a CXL memory protocol. Through a key generation process, a data key for data encryption and decryption is generated for the CXL memory region, and an independent protection key is generated for protecting the data key for the CXL memory region; through a key distribution process, the data key of the CXL memory region is distributed to the CXL memory controller, and during the key distribution process, the data key of the CXL memory region is encrypted and protected by utilizing the protection key of the CXL memory region; and through a key recovery process, the data key of the CXL memory region which is in an encrypted state is decrypted and recovered, so as to enable the computer system to encrypt and decrypt data read and written by the CXL memory region by utilizing the data key of the CXL memory region in a working state.

Figure 2:
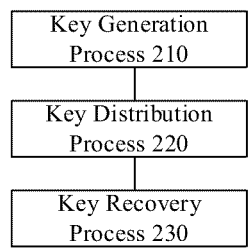
FIG. 2 is an example diagram of a process of a key management solution provided by the embodiments of the present disclosure.

In an optional implementation, FIG. 2 exemplarily illustrates an example diagram of optional processes of a key management method provided by the embodiments of the present disclosure, as shown in FIG. 2, the key management method provided by the embodiments of the present disclosure may include a key generation process 210, a key distribution process 220, and a key recovery process 230.

The key generation process 210 is used to generate a data key and a protection key for the CXL memory region; the key distribution process 220 is used to distribute the data key of the CXL memory region to the CXL memory controller in a low power consumption state of the computer system and to perform encryption and protection utilizing the data key of the CXL memory region; and the key recovery process 230 is used to decrypt and recover the data key of the CXL memory region that is encrypted and protected when the computer system is in a working state, so that the data key of the CXL memory region can be used to encrypt and decrypt the data of the CXL memory region.

Further, the key management method provided by the embodiments of the present disclosure may also be applicable to a non-CXL memory protocol. For example, the key generation process 210 may also generate a data key and a protection key of the non-CXL memory region; and the protection key of the non-CXL memory region is generated in a different manner than the protection key of the CXL memory region. During the key distribution process 220, the data key of the non-CXL memory region is distributed to a non-CXL memory controller, and the data key of the non-CXL memory region is utilized for encryption and protection; optionally, the principle of distributing the data key of the CXL memory region and the non-CXL memory region may be the same. During the key recovery process 230, the data key of the non-CXL memory region that is encrypted and protected is decrypted and recovered, so that the data key of the non-CXL memory region can be used for encrypting and decrypting the data of the non-CXL memory region; optionally, the principle of recovery of the data key of the CXL memory region and the non-CXL memory region may be the same.

That is, in possible implementations, the embodiments of the present disclosure may provide a key management method applicable to both CXL memory protocols and non-CXL memory protocols, which also supports securing the data memory security performance of non-CXL memory protocols while providing a basis for enhancing the data memory security performance of CXL memory protocols.

Figure 3:
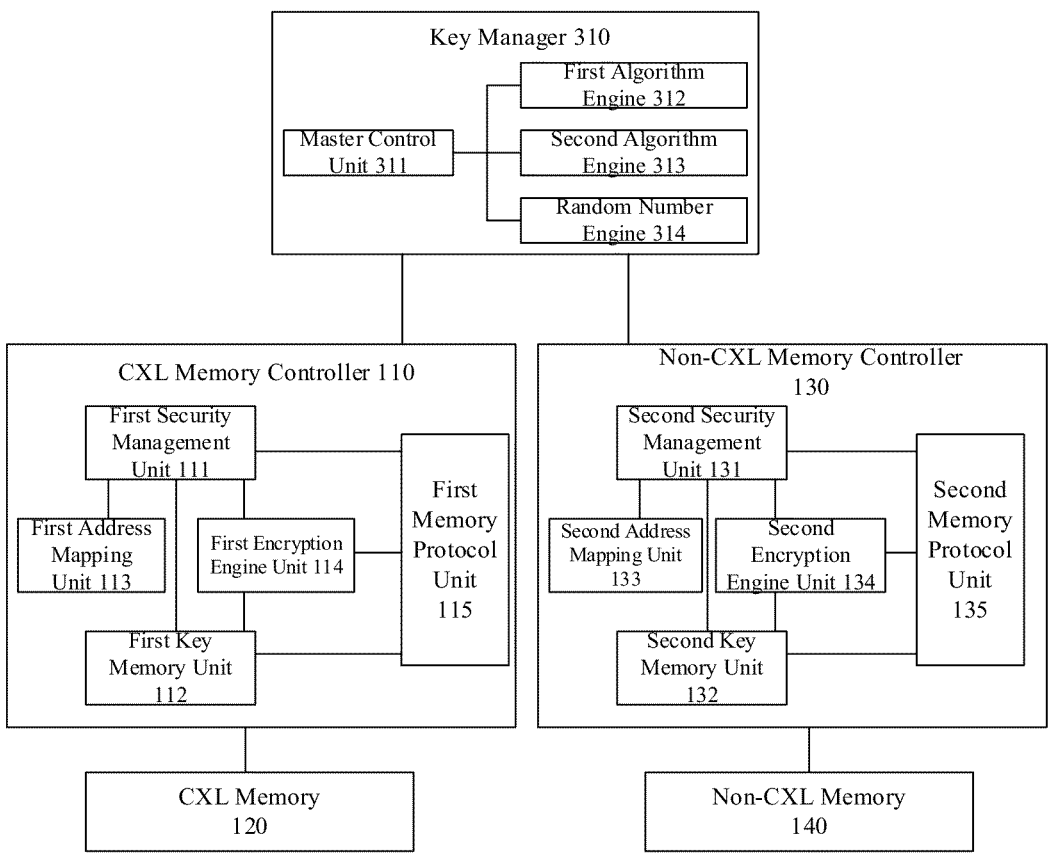
FIG. 3 is an example diagram of another architecture of a computer system provided by the embodiments of the present disclosure.

As an optional implementation, FIG. 3 exemplarily illustrates an example diagram of another architecture of a computer system provided by the embodiments of the present disclosure, as shown in FIG. 3, the computer system may include a key manager 310, a CXL memory controller 110, and a non-CXL memory controller 130; and the CXL memory controller 110 and the non-CXL memory controller 130 may be considered to be memory controllers that support different memory protocols in the computer system.

For example, the key manager 310 is used to be responsible for the key generation process, the key distribution process, and the key recovery process. In terms of hardware implementation, as an optional implementation, the key manager 310 may be a Micro Control Unit (MCU) in a chip, or a device combining an MCU and a hardware algorithm accelerator, and in other possible implementations, the key manager 310 may also be implemented by a processor in a chip.

The CXL memory controller 110 may implement data encryption when writing data, and data decryption when reading data, in the CXL memory region based on the CXL memory protocol. The non-CXL memory controller 130 may implement data encryption when writing data, and data decryption when reading data, in the non-CXL memory region based on the non-CXL memory protocol. As an optional implementation, because the memory has the need for high bandwidth and low latency, the memory controller (the CXL memory controller 110 and the non-CXL memory controller 130 may be collectively referred to as the memory controllers) may use a symmetric algorithm to implement the encryption and decryption of data, of course, the embodiments of the present disclosure may also support the memory controller to implement the encryption and decryption of data by using other encryption and decryption algorithms, such as a asymmetric algorithm. In terms of hardware implementation, as an optional implementation, the non-CXL memory controller may be implemented by a memory controller. It should be noted that, based on the embodiments of the present disclosure providing a method applicable to the non-CXL memory protocol (e.g., a DDR protocol) as well as the CXL memory protocol, the memory controller in a chip system is implemented by a CXL memory controller supporting the CXL memory protocol in addition to a non-CXL memory controller such as a memory controller supporting the non-CXL memory protocol.

Further shown in conjunction with FIG. 3, the key manager 310 may include a master control unit 311, a first algorithm engine 312 (the first algorithm engine may be an engine that supports hash algorithms, symmetric encryption algorithms, or asymmetric encryption algorithms), a second algorithm engine 313 (the second algorithm engine may be an encryption algorithm engine, such as a symmetric encryption algorithm engine, etc.), and a random number engine 314. For example, the master control unit 311 is configured to control the overall process of key generation, key distribution, and key recovery. The first algorithm engine 312 may implement a hash algorithm such as SHA, SM3, etc., or a symmetric encryption algorithm, an asymmetric encryption algorithm, etc.; and the first algorithm engine 312 may be used to implement the protection of the key generation, the integrity protection of information, etc. The second algorithm engine 313 may implement an encryption algorithm, such as a symmetric encryption algorithm such as AES, SM4, etc., or other asymmetric encryption algorithms, etc., for encrypting and decrypting information (e.g., encrypting and decrypting the data key using the protection key). The random number engine 314 is used to implement a physical noise source and random number post-processing logic, and can generate random numbers.

It should be noted that in the embodiments of the present disclosure, the data key is a key for encrypting and decrypting data (e.g., the data key is used for encrypting and decrypting data stored in a memory region); and the protection key is a key for encrypting and protecting the data key.

The embodiments of the present disclosure may support the generation of the data key and protection key of the CXL memory region implemented by the key manager 310, and implement the distribution and recovery of keys by the key manager 310. Further, the embodiments of the present disclosure may also support the generation of the data key and protection key of the non-CXL memory region implemented by the key manager 310, and implement the distribution and recovery of keys by the key manager 310. That is, the generation, distribution, and recovery of keys of both the CXL memory region and the non-CXL memory region may be implemented by the key manager 310.

Further shown in conjunction with FIG. 3, the CXL memory controller 110 may include a first security management unit 111, a first key memory unit 112, a first address mapping unit 113, a first encryption engine unit 114, and a first memory protocol unit 115.

For example, the first security management unit 111 is configured to be responsible for cooperating with the key manager 310 to implement the management of contents stored in the first key memory unit 112, and to configure the first address mapping unit 113 and the first encryption engine unit 114.

The first key memory unit 112 may be configured to store the data key of the CXL memory region. In an optional implementation, the CXL memory is encrypted and decrypted in units of memory address segments, e.g., each memory address segment of the CXL memory is encrypted and decrypted using a different data key (e.g., one memory address segment serves as a continuous CXL memory space of system addresses, which may be considered to be one CXL memory region), whereby the first key memory unit 112 may store a data key for data encryption and decryption for each memory address segment. Optionally, the first key memory unit 112 may be implemented by a memory unit such as an on-chip Static Random Access Memory (SRAM).

The first address mapping unit 113 may be configured to map the CXL memory region of the CXL memory to a designated system space, and the designated system space may store the ciphertext encrypted with the data key of the CXL memory region, and the integrity check information of the ciphertext. The first encryption engine unit 114 is configured to implement a symmetric encryption algorithm such as AES, SM4, etc. As an optional implementation, due to the demand for high bandwidth and low latency of the memory, the first encryption engine unit 114 may adopt a cascade structure to ensure that the bandwidth is not affected, so as to enhance the parallelism of the operation and reduce the latency. The first memory protocol unit 115 may be configured to implement the CXL memory protocol.

Further shown in conjunction with FIG. 3, the non-CXL memory controller 130 may include a second security management unit 131, a second key memory unit 132, a second address mapping unit 133, a second encryption engine unit 134, and a second memory protocol unit 135.

It should be noted that the functions of the second security management unit 131, the second key memory unit 132, the second address mapping unit 133, and the second encryption engine unit 134 are similar to the functions of the first security management unit 111, the first key memory unit 112, the first address mapping unit 113, and the first encryption engine unit 114 as described above; except that the second security management unit 131, the second key memory unit 132, the second address mapping unit 133, and the second encryption engine unit 134 are based on the non-CXL memory protocol; under the non-CXL memory protocol, the functions of the second security management unit 131, the second key memory unit 132, the second address mapping unit 133, and the second encryption engine unit 134 may be referred to in conjunction with the foregoing, and will not be expanded herein. Alternatively, the second memory protocol unit 135 may be configured to implement a non-CXL memory protocol such as DDR, GDDR, HBM, and the like.

In the embodiments of the present disclosure, the key manager may implement the key generation process to generate, for each CXL memory region of the CXL memory that needs to be encrypted and protected, a data key for data encryption and decryption, and a protection key for protecting the data key; furthermore, the key manager may also generate, for each non-CXL memory region of the non-CXL memory that needs to be encrypted and protected during the key generation process, a data key for data encryption and decryption, and a protection key for protecting the data key. That is, in an optional implementation, the key generation process may generate the data key and the protection key separately for each memory region (including each CXL memory region and each non-CXL memory region). It should be noted that the manner in which the embodiments of the present disclosure generate the protection key may be different for the CXL memory region and the non-CXL memory region.

Figure 4:
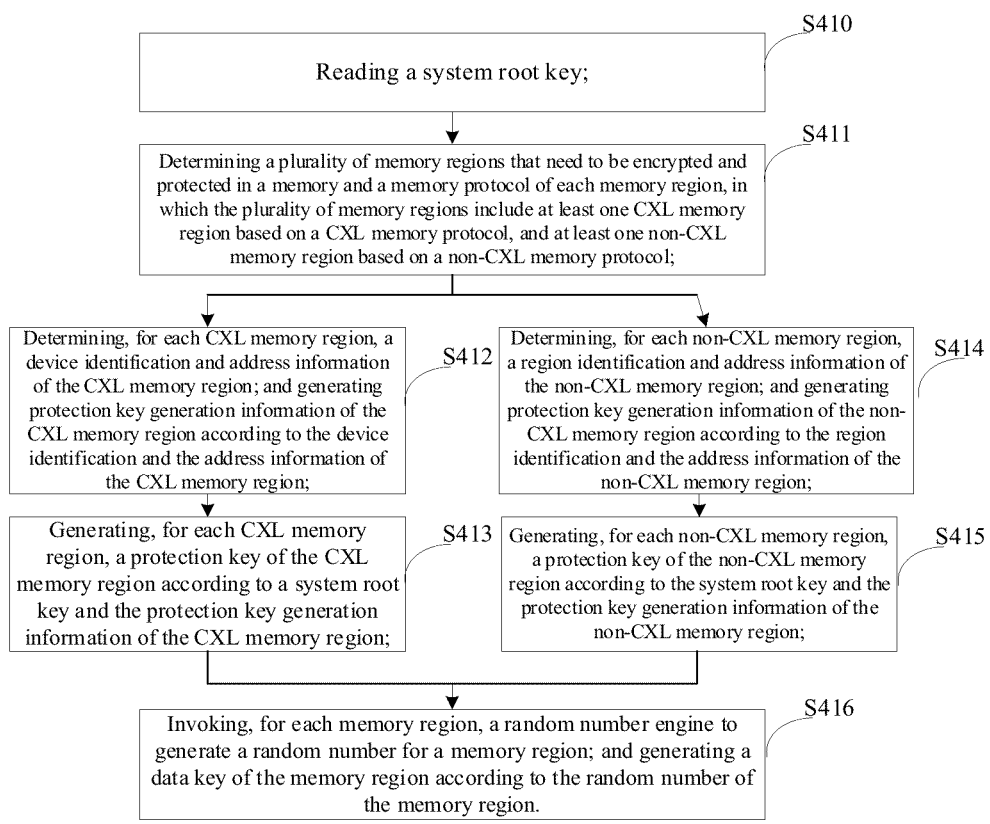
FIG. 4 is a flowchart of a key generation process provided by the embodiments of the present disclosure.

As an optional implementation, FIG. 4 exemplarily illustrates an optional flowchart of a key generation process provided by the embodiments of the present disclosure, the process may be implemented by a key manager, and with reference to FIG. 4, the method process may include the following steps.

In step S410, reading a system root key.

In an optional implementation, the key manager can read the system root key from a chip's one time programmable (OTP) device or the chip's trusted root. For illustrative purposes, the system root key may be defined as K.

In step S411, determining a plurality of memory regions that need to be encrypted and protected in a memory and a memory protocol of each memory region, in which the plurality of memory regions include at least one CXL memory region based on a CXL memory protocol, and at least one non-CXL memory region based on a non-CXL memory protocol.

The memory referred to by the embodiments of the present disclosure may include the CXL memory supporting the CXL memory protocol, and the non-CXL memory (e.g., RAM) supporting the non-CXL memory protocol; in an optional implementation, the embodiments of the present disclosure may determine a plurality of address spaces that need to be encrypted and protected in the CXL memory and the non-CXL memory, such that one address space is considered to be one memory region that need to be encrypted and protected.

Because the embodiments of the present disclosure support both the CXL memory protocol and non-CXL memory protocol, the plurality of memory regions that need to be encrypted and protected as determined by the embodiments of the present disclosure may be categorized into, CXL memory regions based on CXL memory protocols, and non-CXL memory regions based on non-CXL memory protocols. For example, the number of CXL memory regions may be at least one, and the number of non-CXL memory regions may also be at least one.

As an optional implementation, after determining the plurality of memory regions that need to be encrypted and protected, the embodiments of the present disclosure may further determine the memory protocols of the respective memory regions, and because the embodiments of the present disclosure support both the CXL memory protocol and non-CXL memory protocol, the memory protocols of the plurality of memory regions that need to be encrypted and protected may include both the CXL memory protocol and non-CXL memory protocol. Thereby, in the plurality of memory regions that need to be encrypted and protected, the memory region based on the CXL memory protocol may be regarded as a CXL memory region, and the memory region based on the non-CXL memory protocol may be regarded as a non-CXL memory region. That is, the plurality of memory regions that need to be encrypted and protected include a memory region based on a CXL memory protocol (referred to as a CXL memory region), and a memory region of based on a non-CXL memory protocol (referred to as a non-CXL memory region), and the number of CXL memory regions may be at least one, and the number of non-CXL memory regions may also be at least one. In other possible implementations, the plurality of memory regions that need to be encrypted and protected in the memory may also be CXL memory regions and not include non-CXL memory regions.

Figure 5:
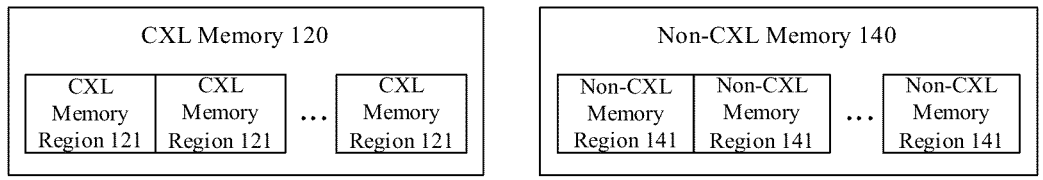
FIG. 5 is an example diagram of a memory provided by the embodiments of the present disclosure.

For ease of understanding, FIG. 5 exemplarily illustrates an example diagram of a memory provided by the embodiments of the present disclosure, as shown in conjunction with FIG. 1, FIG. 3, and FIG. 5, the CXL memory 120 may include a plurality of CXL memory regions 121 based on a CXL memory protocol, and the non-CXL memory 140 may include a plurality of non-CXL memory regions 141 based on a non-CXL memory protocol (e.g., the non-CXL memory region 141 is a DDR-based memory region). The plurality of CXL memory regions 121 and the plurality of non-CXL memory regions 141 may be regarded as memory regions that need to be encrypted and protected by the embodiments of the present disclosure, and a data key and an encryption key need to be generated for the respective CXL memory regions 121 and the respective non-CXL memory regions 141 respectively, and the ways of generating protection keys for the CXL memory region 121 and the non-CXL memory region 141 are different.

As an optional implementation, the correspondence between the memory and the memory region may be that one memory corresponds to a plurality of memory regions (e.g., one CXL memory corresponds to a plurality of CXL memory regions, and one non-CXL memory corresponds to a plurality of non-CXL memory regions), or a plurality of memories correspond to one memory region that need to be encrypted and protected (e.g., a plurality of CXL memories are correspondingly set as one CXL memory region that need to be encrypted and protected, and a plurality of non-CXL memories are correspondingly set as one non-CXL memory region that need to be encrypted and protected); the specific correspondence between the memory and the memory region may be determined according to the configuration of the system, and the embodiments of the present disclosure do not set any limit. For one memory region that need to be encrypted and protected, one memory region may be an address space with consecutive addresses.

As an optional implementation, in the embodiments of the present disclosure, one memory region that need to be encrypted and protected may correspond to one data key and one protection key. Therefore, after determining the plurality of memory regions that need to be encrypted and protected in the memory, the embodiments of the present disclosure may accordingly determine the number of data keys and the number of protection keys that need to be generated by the key manager.

In step S412, determining, for each CXL memory region, a device identification and address information of the CXL memory region; and generating protection key generation information of the CXL memory region according to the device identification and the address information of the CXL memory region.

In step S413, generating, for each CXL memory region, a protection key of the CXL memory region according to a system root key and the protection key generation information of the CXL memory region.

In the aspect of generating a protection key for a memory region, for each CXL memory region based on the CXL memory protocol, the embodiments of the present disclosure can determine the device identification (a device identification such as a device number) and address information (e.g., a start address and an end address) of the CXL memory region, so as to generate the protection key generation information of the CXL memory region based on the device identification and the address information of the CXL memory region; and the protection key generation information of the CXL memory region is used to generate the protection key of the CXL memory region.

In an optional implementation, the device identification of the CXL memory region may be a device number; for each CXL memory region, the embodiments of the present disclosure may determine a device number, a start address and an end address of the CXL memory region; and thereby the start address, the end address, and the device number of the CXL memory region are spliced (e.g., the start address and end address of the CXL memory region are connected with the device number) to generate protection key generation information of the CXL memory region.

Optionally, the device number of the CXL memory region may be a result of splicing a bus ID (BUS ID), a device ID (DEVICE ID), and a function ID (FUNCTION ID) of the CXL memory region, e.g., for a CXL memory region, the BUS ID+DEVICE ID+FUNCTION ID of the CXL memory region=the device number of the CXL memory region. In an example, the present disclosure can determine a BUS ID, a DEVICE ID, and a FUNCTION ID of a CXL memory region, and splice the BUS ID, the DEVICE ID, and the FUNCTION ID of the CXL memory region, and the result of the splicing is used as the device number of the CXL memory region. For illustrative purposes, the embodiments of the present disclosure may define the device number of the CXL memory region as $P_j$; thereby, for a CXL memory region, the embodiments of the present disclosure can splice together the start address, the end address, and the device number $P_j$ of the CXL memory region, to generate the protection key generation information of the CXL memory region. For illustrative purposes, the protection key generation information for the CXL memory region may be defined as $PA_j$.

After obtaining the protection key generation information of each CXL memory region, for any CXL memory region, the embodiments of the present disclosure can generate a protection key of the CXL memory region according to a system root key K predetermined and the protection key generation information $PA_j$ of the CXL memory region. As an optional implementation, for any CXL memory region, the embodiments of the present disclosure can splice the system root key K and the protection key generation information $PA_j$ of the CXL memory region, and the splicing result is processed by a hash algorithm (e.g., the splice result is input into a first algorithm engine in the key manager that supports the hash algorithm for processing), thereby obtaining the protection key of the CXL memory region. For example, the system root key K and the protection key generation information $PA_j$ of the CXL memory region are spliced, and the splicing result is used as an input to a hash algorithm engine, thereby obtaining the protection key of the CXL memory region output by the hash algorithm engine.

It should be noted that because device numbers of different CXL memory regions are different (e.g., at least one of the bus ID, device ID, and function ID of the different CXL memory regions is different), and address information of different CXL memory regions are different, each CXL memory region has independent protection key generation information $PA_j$. Further, the embodiments of the present disclosure may generate an independent protection key for each CXL memory region based on the independent protection key generation information $PA_j$ of each CXL memory region, when generating protection keys for different CXL memory regions, i.e., the protection keys of different CXL memory regions are different.

In step S414, determining, for each non-CXL memory region, a region identification and address information of the non-CXL memory region; and generating protection key generation information of the non-CXL memory region according to the region identification and the address information of the non-CXL memory region.

In step S415, generating, for each non-CXL memory region, a protection key of the non-CXL memory region according to the system root key and the protection key generation information of the non-CXL memory region.

In an optional implementation, for each non-CXL memory region, the embodiments of the present disclosure may determine, from an OPT or other trusted roots, a region ID of the non-CXL memory region as the region identification of the non-CXL memory region; and determine a start address and an end address of the non-CXL memory region (the start address and the end address of the non-CXL memory region may be considered to be an example of the address information of the non-CXL memory region). Further, the embodiments of the present disclosure can splice the start address and the end address of the non-CXL memory region with the region identification to generate the protection key generation information of the non-CXL memory region. For illustrative purposes, the embodiments of the present disclosure may define the region identification of the non-CXL memory region as $D_i$, and for a non-CXL memory region, the start address and the end address of the non-CXL memory region are spliced together with the region identification $D_i$ to generate the protection key generation information of the non-CXL memory region. For illustrative purposes, the embodiments of the present disclosure define the protection key generation information for the non-CXL memory region as $DA_i$.

After obtaining the protection key generation information of each non-CXL memory region, for any non-CXL memory region, the embodiments of the present disclosure can generate a protection key of the non-CXL memory region according to a system root key K predetermined and the protection key generation information $DA_i$ of the non-CXL memory region. As an optional implementation, for any non-CXL memory region, the embodiments of the present disclosure can splice the system root key K and the protection key generation information $DA_i$ of the non-CXL memory region, and the splicing result is processed by a hash algorithm, thereby obtaining the protection key of the non-CXL memory region.

It should be noted that because region identification of different non-CXL memory regions are different, each non-CXL memory region has independent protection key generation information $DA_i$. Further, the embodiments of the present disclosure may generate an independent protection key for each non-CXL memory region based on the independent protection key generation information $DA_i$ of each non-CXL memory region, when generating protection keys for different non-CXL memory regions, i.e., the protection keys of different non-CXL memory regions are different.

In step S416, invoking, for each memory region, a random number engine to generate a random number for a memory region; and generating a data key of the memory region according to the random number of the memory region.

In the embodiments of the present disclosure, each memory region generates a data key by generating a random number; for example, for any memory region, the embodiments of the present disclosure can invoke a random number engine to generate a random number of the memory region, thereby generating the data key according to the random number of the memory region. That is, for both CXL memory regions and non-CXL memory regions, in the embodiments of the present disclosure, a random number is generated for the memory region, and then the data key of the memory region is generated using the random number of the memory region. The embodiments of the present disclosure can generate the data key of each CXL memory region, and the data key of each non-CXL memory region.

It should be noted that steps S412 and S413 are for generating the protection key for the CXL memory region, steps S414 and S415 are for generating the protection key for the non-CXL memory region, and step S416 is for generating the data key for each memory region, and thus steps S412 and S413, steps S414 and S415, and step S416 may be in a side-by-side relationship and not necessarily a sequential execution relationship.

The key management method provided by the embodiments of the present disclosure is capable of generating a data key for data encryption and decryption for a CXL memory region, and generating an independent protection key for protecting the data key for the CXL memory region; and because the device identification and address information of different CXL memory regions are different, each CXL memory region has an independent protection key generation information when generating the protection key generation information based on the respective device identification and address information; thereby, based on the independent protection key generation information of each CXL memory region, the embodiments of the present disclosure can enable the protection keys of different CXL memory regions to be different when generating the protection key according to the system root key and the protection key generation information of the CXL memory region (that is, the protection key of each CXL memory region is independent); and then using the independent protection key of the CXL memory region to encrypt and protect the data key of the CXL memory region can ensure the security of the data key used for data encryption and decryption in the CXL memory region while implementing the scalability of the CXL memory protocol; in addition, the data key of the CXL memory region is generated by a random number, and thus the data key of the CXL memory region is not related to the system root key, which can effectively avoid the risk of the system root key being cracked due to the data key being cracked, thus enhancing the security of the computer system.

The embodiments of the present disclosure generate the data key for data encryption and decryption for the CXL memory region, and generate an independent protection key for protecting the data key for the CXL memory region, so as to encrypt and protect the data key of the CXL memory region through the independent protection key of the CXL memory region, and to enhance the security of the data key of the CXL memory region; and thus, it is able to provide a technical basis for the subsequent use of the data key of the CXL memory region to protect the data security of the CXL memory region, and provide a technical basis for enhancing the data memory security performance of the CXL memory protocol.

It is also noted that the embodiments of the present disclosure may also generate a protection key and a data key for any non-CXL memory region through the process shown in FIG. 4; for any non-CXL memory region, the data key of the non-CXL memory region may be used to encrypt and decrypt the data in the non-CXL memory region, and the protection key of the non-CXL memory region may be used to protect the data key of the non-CXL memory region.

After generating data keys for respective memory regions (e.g., after generating data keys for respective CXL memory regions and respective non-CXL memory regions), the embodiments of the present disclosure can distribute a data key of a memory region to a key memory unit of a memory controller corresponding to the memory region, so that the memory controller corresponding to the memory region can use the data key of the memory region stored in the key memory unit to encrypt and decrypt the data of the memory region; and during the key distribution process, the embodiments of the present disclosure can simultaneously use a protection key of the memory region to encrypt and protect the data key of the memory region, and write the encrypted and protected ciphertext and the integrity check information of the ciphertext into the system space mapped to the memory region.

It should be noted that, considering that the computer system may have a variety of low power consumption scenarios, and the computer system may also mount a non-volatile memory medium, the data key of the memory region not only needs to be distributed to the memory controller corresponding to the memory region for encrypting and decrypting the data in the memory region; in addition, it is also necessary to use the protection key of the memory region to encrypt and protect the data key of the memory region, and then distribute the data key to the system space mapped to the memory region, so that when the computer system subsequently recovers from a low power consumption state to a working state, the computer system can recover the secure and correct data key of the memory region through the system space mapped to the memory region.

As an optional implementation, based on the fact that the embodiments of the present disclosure support both the CXL memory protocol and non-CXL memory protocol, the key distribution process of the embodiments of the present disclosure involves the key distribution of the CXL memory region, and the key distribution of the non-CXL memory region. Optionally, the key distribution process of the CXL memory region and the non-CXL memory region can be implemented in the same way, so the embodiments of the present disclosure collectively refer to the CXL memory region and the non-CXL memory region in terms of the memory regions and introduce the key distribution process as such.

Figure 6:
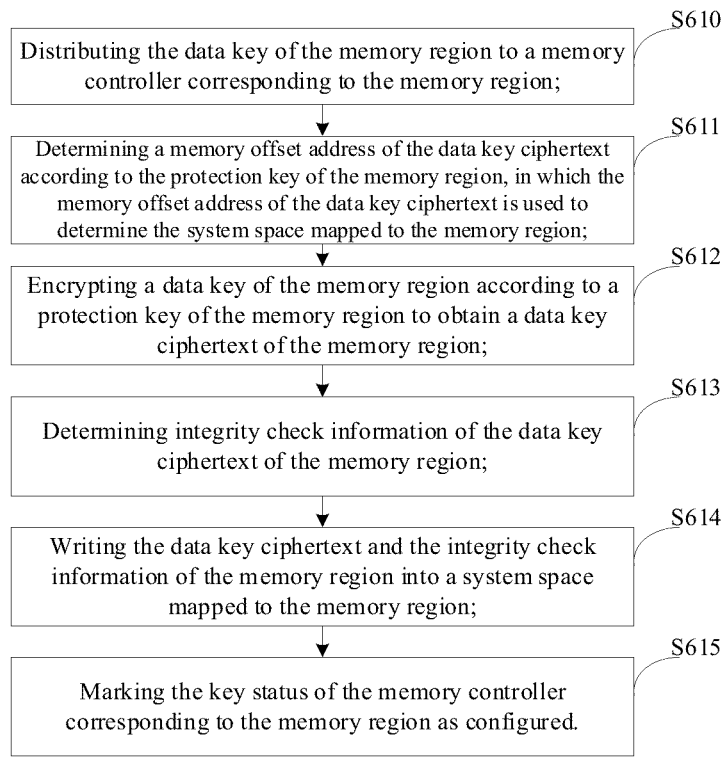
FIG. 6 is a flowchart of a key distribution process provided by the embodiments of the present disclosure.

As an optional implementation, FIG. 6 exemplarily illustrates an optional flowchart of a key distribution process provided by the embodiments of the present disclosure, the process may be implemented by a key manager, with reference to FIG. 6, the process may include the following steps.

In step S610, distributing the data key of the memory region to a memory controller corresponding to the memory region.

As an optional implementation, the memory region in the computer system may include a CXL memory region, and the memory controller may include a CXL memory controller; and for the CXL memory region, the embodiments of the present disclosure can distribute the data key of the CXL memory region to the CXL memory controller.

Optionally, a key memory unit may be provided in the memory controller for saving the data key of the memory region; thereby, the data key of the memory region may be distributed to the key memory unit in the memory controller corresponding to the memory region. For example, a first key memory unit may be provided in the CXL memory controller for saving the data key of the CXL memory region; thereby, the data key of the CXL memory region may be distributed to the first key memory unit of the CXL memory controller for saving.

In a further optional implementation, the memory region in the computer system may also include a non-CXL memory region, and the memory controller may also include a non-CXL memory controller; for the non-CXL memory region, the embodiments of the present disclosure can distribute the data key of the non-CXL memory region to the non-CXL memory controller. For example, a second key memory unit may be provided in the non-CXL memory controller for saving the data key of the non-CXL memory region; thereby the data key of the non-CXL memory region can be distributed to the second key memory unit of the non-CXL memory controller for saving.

In step S611, determining a memory offset address of the data key ciphertext according to the protection key of the memory region, in which the memory offset address of the data key ciphertext is used to determine the system space mapped to the memory region.

As an optional implementation, in the embodiments of the present disclosure, the protection key of the memory region can encrypt and protect the data key of the memory region to obtain a ciphertext of the data key; and the ciphertext and the integrity check information for verifying the integrity of the ciphertext may be saved to a system space mapped to the memory region. For example, for a CXL memory region, the CXL memory region may have a mapped system space, and after the data key of the CXL memory region is encrypted and protected using the protection key of the CXL memory region, the ciphertext of the data key of the CXL memory region and the integrity check information of the ciphertext may be saved to the system space mapped to the CXL memory region. For another example, for a non-CXL memory region, the non-CXL memory region may have a mapped system space, and after the data key of the non-CXL memory region is encrypted and protected using the protection key of the non-CXL memory region, the ciphertext of the data key of the non-CXL memory region and the integrity check information of the ciphertext may be saved to the mapped system space of the non-CXL memory region.

As an optional implementation, when determining the system space to which the memory region is mapped, the embodiments of the present disclosure can determine an offset address of a ciphertext encrypted by a data key in a corresponding memory region according to a protection key of the memory region, and for illustrative purposes, the ciphertext encrypted by the data key may be referred to as a data key ciphertext, and the offset address of the data key ciphertext in the corresponding memory region may be referred to as a memory offset address of the data key ciphertext; and the embodiments of the present disclosure can determine an address range of the system space mapped to the memory region through the memory offset address of the data key ciphertext. It should be noted that, for a CXL memory region or a non-CXL memory region, the overall offset address of the memory region may be determined by the system, and the memory offset address of the data key ciphertext determined by the embodiments of the present disclosure is the offset address of the data key ciphertext in the corresponding memory region, i.e., the offset address of the data key ciphertext relative to the memory region, which is not different from the overall offset address of the memory region.

Optionally, during an optional process of determining the memory offset address of the data key ciphertext, the embodiments of the present disclosure may copy the protection key of the memory region, and the protection key of the memory region and the copied protection key may be spliced, so as to determine an intermediate offset address according to the splicing result, and then determine the memory offset address of the data key ciphertext according to the intermediate offset address and the size of the address space of the memory region. For example, for any memory region, the embodiments of the present disclosure may copy the protection key of the memory region and splice the copied protection key with the protection key, and the splicing result may be input to a first algorithm engine (e.g., a hash algorithm engine) of the key manager to obtain an intermediate offset address Oi outputted from the first algorithm engine; and the intermediate offset address Oi is used to perform remainder processing on the size of the address space of the memory region, thereby obtaining the memory offset address Ai of the data key ciphertext. For illustrative purposes, the intermediate offset address may be defined as Oi, and the memory offset address of the data key ciphertext may be defined as Ai. It should be noted that the memory offset address of the data key ciphertext is determined in the same manner for both the CXL memory region and the non-CXL memory region.

It should also be noted that the purpose of copying the protection key of the memory region and then splicing the copied protection key with the protection key is to extend the length for subsequent processing by the hash algorithm engine.

After determining the memory offset address Ai of the data key ciphertext, determining the system space mapped to the memory region may be implemented by a memory controller corresponding to the memory region, for example, the memory controller may be provided with an address mapping unit to map the system space of the memory region based on the memory offset address of the data key ciphertext. Thereby, the key manager may, after determining the memory offset address of the data key ciphertext, configure the memory offset address of the data key ciphertext to an address mapping unit of a corresponding memory controller, and the address mapping unit may implement mapping the system space of the memory region. For example, the CXL memory controller may be provided with a first address mapping unit, and for any CXL memory region, the memory offset address of the data key ciphertext may be configured to the first address mapping unit of the CXL memory controller, and the first address mapping unit implements mapping the system space of the CXL memory region. For another example, the non-CXL memory controller may be provided with a second address mapping unit, and for any non-CXL memory region, the memory offset address of the data key cipher text may be configured to the second address mapping unit of the non-CXL memory controller, and the second address mapping unit implements mapping the system space of the non-CXL memory region.

As an optional implementation, the address mapping unit of the memory controller, after configuring the memory offset address Ai of the data key ciphertext, may determine a start address Si of the system space mapped to the memory region according to the memory offset address Ai of the data key ciphertext and a start address Bi of the memory region; thereby, an address range of the system space mapped to the memory region is determined according to the start address Si of the system space and a preset designated size L of the system space. For ease of illustration, for a memory region, the start address of the memory region may be defined as Bi, and the size of the system space mapped to the memory region is a specified size, defined as L.

In an example implementation, for any of the memory regions that need to be protected, the address mapping unit of the memory controller, after configuring the memory offset address Ai of the data key ciphertext, may add the start address Bi of the memory region to the memory offset address Ai to obtain the start address Si of the system space mapped to the memory region; thereby, the system space of a designated size L with a start address Si is the system space mapped to the memory region. It should be noted that the start address of the mapped system space and the address range are determined in the same manner for the CXL memory region and the non-CXL memory region.

In step S612, encrypting a data key of the memory region according to a protection key of the memory region to obtain a data key ciphertext of the memory region.

When distributing the data key of the memory region to the corresponding memory controller, the embodiments of the present disclosure may utilize the protection key of the memory region to encrypt the data key of the memory region, and write the encrypted ciphertext and the integrity check information into the system space mapped to the memory region, to implement secure encryption and protection of the data key of the memory region.

For illustrative purposes, for any memory region, the protection key of the memory region may be defined as $P_i$ and the data key may be defined as $K_i$; thus, for any memory region, the key manager can invoke a second algorithm engine (e.g., an encryption algorithm engine such as a symmetric encryption algorithm engine) to encrypt the data key $K_i$ using the protection key $P_i$ of the memory region, so as to obtain the data key ciphertext (the ciphertext of the data key may be referred to as the data key ciphertext) of the memory region. For example, for the CXL memory region, the key manager can invoke the second algorithm engine to encrypt the data key $K_i$ using the protection key $P_i$ of the CXL memory region, so as to obtain a data key ciphertext $M_i$ of the CXL memory region. For another example, for the non-CXL memory region, the key manager can invoke the second algorithm engine to encrypt the data key $K_i$ using the protection key $P_i$ of the non-CXL memory region, so as to obtain a data key ciphertext $M_i$ of the non-CXL memory region.

In step S613, determining integrity check information of the data key ciphertext of the memory region.

The integrity check information of the data key ciphertext may be used to perform integrity checking of the data key ciphertext, and as an optional implementation, the embodiments of the present disclosure can determine the integrity check information of the data key ciphertext according to the data key ciphertext of the memory region and the protection key. Optionally, for any memory region, the embodiments of the present disclosure can splice the data key ciphertext $M_i$ and the protection key $P_i$ of the memory region, and utilize a first algorithm engine (e.g., a hash algorithm engine) of the key manager to process the splicing result to obtain the integrity check information; for example, the splicing result is input into the hash algorithm engine of the key manager, and processed by a hash algorithm, and the hash value obtained may be used as the integrity check information. For ease of illustration, the integrity check information may be defined as $H_i$.

In one example, for a CXL memory region, the embodiments of the present disclosure can splice the data key ciphertext $M_i$ and the protection key $P_i$ of the CXL memory region, and the splicing result is processed by a hash algorithm, and the hash value obtained is used as the integrity check information $H_i$. In another example, for a non-CXL memory region, the embodiments of the present disclosure can splice the data key ciphertext $M_i$ and the protection key $P_i$ of the non-CXL memory region, and the splicing result is processed by a hash algorithm, and the hash value obtained is used as the integrity check information $H_i$.

In step S614, writing the data key ciphertext and the integrity check information of the memory region into a system space mapped to the memory region.

For any memory region, after obtaining the data key ciphertext $M_i$ and the integrity check information $H_i$ of the memory region, the embodiments of the present disclosure can write the data key ciphertext $M_i$ and the integrity check information $H_i$ of the memory region into the system space mapped to the memory region. For example, for a plurality of memory regions, the embodiments of the present disclosure can write the data key ciphertext $M_i$ and the integrity check information $H_i$ of the plurality of memory regions to system spaces mapped to the memory regions in order of the plurality of memory regions. In an example, for any CXL memory region, the embodiments of the present disclosure can write the data key ciphertext and integrity check information of the CXL memory region into the system space mapped to the CXL memory region; and for any non-CXL memory region, the embodiments of the present disclosure can write the data key ciphertext and integrity check information of the non-CXL memory region into the system space mapped to the non-CXL memory region.

In an optional implementation, one memory region may map one system space (e.g., different memory regions map different system spaces). The embodiments of the present disclosure can determine a memory offset address of a data key ciphertext according to a protection key of the memory region, and determine a system space mapped to the memory region through the memory offset address of the data key ciphertext, and because protection keys of respective memory regions are independent of each other, system spaces map to respective memory regions are different. In other possible implementations, the respective memory regions may map a unified system space, that is, the data key ciphertexts and integrity check information of the respective memory regions (including respective CXL memory regions and respective non-CXL memory regions) are uniformly stored in the unified system space; in this case, the above-mentioned step S611 may optionally not be performed, but rather, in the case where the unified system space is specified in advance, the data key ciphertexts and integrity check information of the respective memory regions are uniformly stored in the unified system space.

As an optional implementation, the embodiments of the present disclosure may randomly select a segment of space in the system space mapped to the memory region, and write the data key ciphertext and the integrity check information of the memory region into the randomly selected space. For example, an address segment is randomly selected from an address range of the system space mapped to the memory region, and the data key ciphertext and the integrity check information of the memory region are written into the space corresponding to the randomly selected address segment.

In step S615, marking the key status of the memory controller corresponding to the memory region as configured.

After distributing the data key of the memory region to the corresponding memory controller, and writing the data key ciphertext and the integrity check information of the memory region into the system space mapped to the memory region, the embodiments of the present disclosure may be regarded as implementing the key distribution and performing secure protection on the data key of the memory region during the process of key distribution; thereby, the embodiments of the present disclosure can mark the key status of the memory controller corresponding to the memory region as configured. For example, the key status of the CXL memory controller is marked as configured, and the key status of the non-CXL memory controller is marked as configured.

Further, after completing the process of key distribution, the memory controller may enter a working state, for example, the computer system entering a working state from a low power consumption state causes the memory controller to enter a working state accordingly.

In some further embodiments, when the computer system recovers from a low power consumption state to a working state, the embodiment of the present disclosure need to recover the data key of the memory region from the system space mapped to the memory region, thereby enabling the memory controller to utilize the data key of the memory region to encrypt and decrypt the data of the memory region. Further, during the process of recovering the data key of the memory region, the embodiments of the present disclosure can perform integrity checking on the data key.

Figure 7:
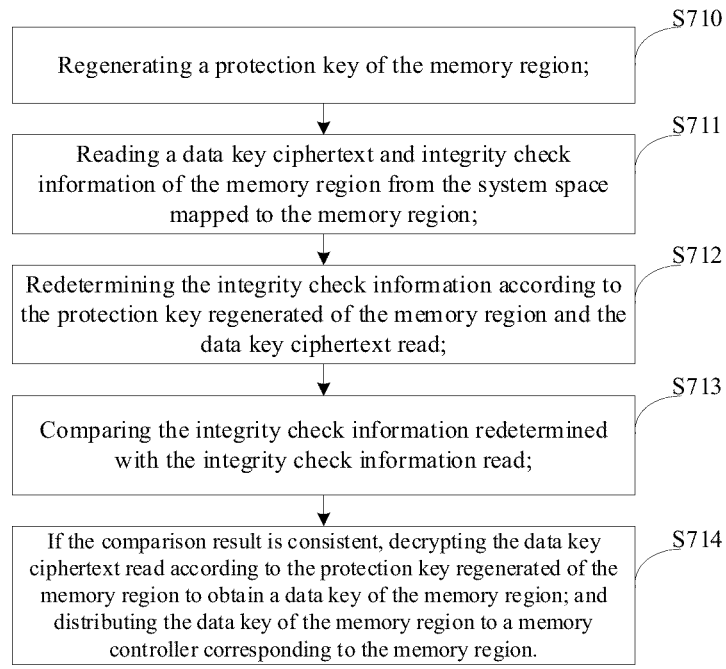
FIG. 7 is a flowchart of a key recovery process provided by the embodiments of the present disclosure.

As an optional implementation, FIG. 7 exemplarily illustrates an optional flowchart of a key recovery process provided by the embodiments of the present disclosure, and the process may be implemented by a key manager, with reference to FIG. 7, the process may include the following steps.

In step S710, regenerating a protection key of the memory region.

For any memory region, the embodiments of the present disclosure need to regenerate the protection key of the memory region during the key recovery process and determine the system space mapped to the memory region. For example, for a CXL memory region, the embodiments of the present disclosure need to regenerate the protection key of the CXL memory region. For another example, for a non-CXL memory region, the embodiments of the present disclosure need to regenerate the protection key of the non-CXL memory region. The optional implementation of generating protection keys of the CXL memory region and the non-CXL memory region may be described with reference to the corresponding part of the preceding section and will not be expanded herein.

Further, the embodiments of the present disclosure may redetermine the system space mapped to the memory region, for example, redetermine the system space mapped to the CXL memory region, and the system space mapped to the non-CXL memory region. The system spaces mapped to respective memory regions may be different, or the respective memory regions may map to a unified memory space. Optional implementations of determining the system space mapped to the CXL memory region and the system space mapped to the non-CXL memory region may be described with reference to the corresponding part of the preceding section and will not be expanded herein.

In step S711, reading a data key ciphertext and integrity check information of the memory region from the system space mapped to the memory region.

The embodiments of the present disclosure can read, from the system space mapped to the memory region, the data key ciphertext $M_i$ and the integrity check information $H_i$ of the memory region. For example, for a CXL memory region, the embodiments of the present disclosure can read, from the system space mapped to the CXL memory region, the data key ciphertext $M_i$ and the integrity check information $H_i$ of the CXL memory region. For another example, for a non-CXL memory region, the embodiments of the present disclosure can read, from the system space mapped to the non-CXL memory region, the data key ciphertext $M_i$ and the integrity check information $H_i$ of the non-CXL memory region.

In step S712, redetermining the integrity check information according to the protection key regenerated of the memory region and the data key ciphertext read.

In step S713, comparing the integrity check information redetermined with the integrity check information read.

After reading, from the system space mapped to the memory region, the data key ciphertext $M_i$ and the integrity check information $H_i$ of the memory region, the embodiments of the present disclosure can redetermine the integrity check information according to the protection key $P_i$ of the memory region regenerated by step S710, and the data key ciphertext $M_i$ of the memory region read by step S711. For example, the protection key $P_i$ of the memory region regenerated by step S710, and the data key ciphertext $M_i$ of the memory region read by step S711 are spliced, and the splicing result is processed using a hash algorithm (e.g., the splicing result is processed by a first algorithm engine of the key manager) to obtain the integrity check information redetermined. For illustrative purposes, the integrity check information redetermined may be defined as $RH_i$.

In one example, for a CXL memory region, the embodiments of the present disclosure can splice the protection key $P_i$ of the CXL memory region with the data key ciphertext $M_i$ read of the CXL memory region, and the splicing result is processed using a hashing algorithm to obtain the integrity check information $RH_i$ redetermined. In another example, for a non-CXL memory region, the embodiments of the present disclosure can splice the protection key $P_i$ of the non-CXL memory region with the data key ciphertext $M_i$ read of the non-CXL memory region, and the splicing result is processed using a hashing algorithm to obtain the integrity check information $RH_i$ redetermined.

For any memory region, after redetermining the integrity check information $RH_i$, the embodiments of the present disclosure can compare the integrity check information $RH_i$ redetermined with the integrity check information $H_i$ read at step S711, in order to determine, by means of the comparison result, whether or not the data key ciphertext stored in the system space mapped to the memory region has been modified.

In step S714, if the comparison result is consistent, decrypting the data key ciphertext read according to the protection key regenerated of the memory region to obtain a data key of the memory region; and distributing the data key of the memory region to a memory controller corresponding to the memory region.

The comparison result of step S713 is consistent, indicating that the data key ciphertext saved in the system space mapped to the memory region has not been modified, and the data key ciphertext read from the system space by the embodiments of the present disclosure is integral; thus, the embodiments of the present disclosure can use the protection key of the memory region to decrypt the data key ciphertext read from the system space to obtain the data key of the memory region; and after obtaining the data key of the memory region, the data key of the memory region may be distributed to a key memory unit of a corresponding memory controller.

For example, for a CXL memory region, when determining that the data key ciphertext saved in the system space mapped to the CXL memory region has not been modified, the embodiments of the present disclosure can use the protection key of the CXL memory region to decrypt the data key ciphertext read from the system space to obtain the data key of the CXL memory region; thereby, the data key of the CXL memory region is distributed to a first key memory unit of the CXL memory controller.

For another example, for a non-CXL memory region, when determining that the data key ciphertext saved in the system space mapped to the non-CXL memory region has not been modified, the embodiments of the present disclosure can use the protection key of the non-CXL memory region to decrypt the data key ciphertext read from the system space to obtain the data key of the non-CXL memory region; thereby, the data key of the non-CXL memory region is distributed to a second key memory unit of the non-CXL memory controller.

Further, after distributing the data key of the memory region to the corresponding memory controller, the embodiments of the present disclosure may mark the key status of the corresponding memory controller as configured. For example, after distributing the data key of the CXL memory region to the first key memory unit of the CXL memory controller, the embodiments of the present disclosure may mark the key status of the CXL memory controller as configured. For another example, after distributing the data key of the non-CXL memory region to the second key memory unit of the non-CXL memory controller, the embodiments of the present disclosure may mark the key status of the non-CXL memory controller as configured.

After the key status of the memory controller is marked as configured, the computer system may enter a working state, whereby the memory controller enters a working state and is able to encrypt and decrypt the data in the memory region using the data key of the memory region.

In a further optional implementation, if the comparison result of step S713 is inconsistent, it means that the data key ciphertext saved in the system space mapped to the memory region has been modified, the data key ciphertext read from the system space by the embodiments of the present disclosure is not integral, and the embodiments of the present disclosure may terminate the key recovery process.

The embodiments of the present disclosure provide a key management method applicable to a CXL memory protocol (which may also be applicable to a non-CXL memory protocol) in combination with the characteristics of flexibility and scalability of the CXL memory protocol, which can provide a basis for enhancing the data memory security performance of the CXL memory protocol. The key generation process in the solutions provided by the embodiments of the present disclosure is capable of generating a data key and a protection key for each CXL memory region that needs to be protected, respectively, and the protection keys of respective CXL memory regions are independent of each other, which is capable of implementing the security protection of the data key of each CXL memory region in the case of guaranteeing the scalability of the CXL memory protocol, and providing a basis for the data memory security of the CXL memory region. In addition, in the embodiments of the present disclosure, the data key of each CXL memory region is generated by a random number, and the data key is not related to the system root key, which can effectively avoid the risk of the system root key being cracked due to the data key being cracked. The key generation process provided by the embodiments of the present disclosure is also applicable to a non-CXL memory protocol.

Further, the key distribution process and the key recovery process in the solutions provided by the embodiments of the present disclosure support the key distribution configuration of a computer system in a low power consumption state, and the key recovery configuration in a working state; and by means of the integrity check information, the data key configured in the key distribution process is guaranteed to be consistent with the data key configured in the key recovery process, which provides a basis for data encryption and decryption using the secure data key of the CXL memory region, and further enhances the data security performance of the CXL memory protocol.

In some further embodiments, in a working state of the computer system, the embodiments of the present disclosure may use a data key of a memory region configured by a memory controller to perform data protection of the data of the memory region. As an optional implementation, the memory controller may perform the data protection process. For example, the data protection process is performed by a CXL memory controller to encrypt and decrypt the data of the CXL memory region using a data key corresponding to the CXL memory region configured by the CXL memory controller. For another example, the data protection process is performed by a non-CXL memory controller to encrypt and decrypt the data of the non-CXL memory region using a data key corresponding to the non-CXL memory region configured by the non-CXL memory controller.

Figure 8:
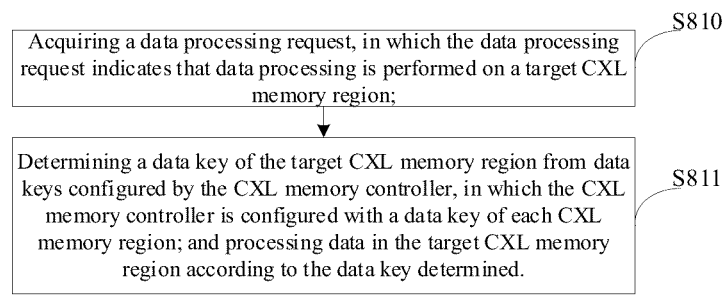
FIG. 8 is a flowchart of a data protection method provided by the embodiments of the present disclosure.

Taking the case where the data of the CXL memory region is performed data protection by the CXL memory controller as an example, FIG. 8 exemplarily illustrates a flowchart of a data protection method provided by the embodiments of the present disclosure, the process may be implemented by the CXL memory controller, and with reference to FIG. 8, the process may include the following steps.

In step S810, acquiring a data processing request, in which the data processing request indicates that data processing is performed on a target CXL memory region.

The target CXL memory region is a CXL memory region for which the data processing is requested, which may be any CXL memory region, depending on a request address carried by the data processing request. Optionally, the data processing request may carry a request address, and the request address may indicate the target CXL memory region for which the data processing is directed, and the address in the target CXL memory region where the data processing is to be performed. In one example, the data processing request may be a data read request indicating data to be read from the target CXL memory region; the data read request may carry a data read address, and the data read address may indicate the target CXL memory region from which the data is to be read, and the address in the target CXL memory region from which the data is to be read. In another example, the data processing request may be a data write request indicating writing data to the target CXL memory region; the data write request may carry a data write address and write data, and the data write address may indicate the target CXL memory area where the data needs to be written, and the write address of the write data in the target CXL memory region.

In step S811, determining a data key of the target CXL memory region from data keys configured by the CXL memory controller, in which the CXL memory controller is configured with a data key of each CXL memory region; and processing data in the target CXL memory region according to the data key determined.

Based on the key management method provided by the embodiments of the present disclosure, the CXL memory controller is configured with a data key of each CXL memory region; the CXL memory controller, when obtaining a data processing request for the target CXL memory region, can determine a data key corresponding to the target CXL memory region from the configured data keys, so as to process the data in the target CXL memory region according to the data key determined. For example, in the case where the data processing request is a data read request, the data read from the data read address of the target CXL memory region is decrypted according to the data key of the target CXL memory region. For another example, in the case where the data processing request is a data write request, the write data is encrypted according to the data key of the target CXL memory region, and the write data encrypted is saved to the data write address of the target CXL memory region.

Optionally, the CXL memory controller may determine a data key corresponding to the target CXL memory region from the first key memory unit, and the first key memory unit saves data keys of respective CXL memory regions.

The data protection method provided by the embodiments of the present disclosure can use a secure data key in the CXL memory region to encrypt and decrypt the data in the CXL memory region to ensure the security of the data stored in the CXL memory region.

In some further embodiments, the data protection method provided by the embodiments of the present disclosure may also be applicable to a non-CXL memory protocol. Optionally, in the case where data protection is implemented by a non-CXL memory controller, the non-CXL memory controller may acquire a data processing request, and the data processing request indicates that data processing is performed on a target non-CXL memory region; thereby, the non-CXL memory controller may determine a data key of the target non-CXL memory region, and process the data of the target non-CXL memory region according to the data key determined. Optionally, based on the key management method provided by the embodiments of the present disclosure, the non-CXL memory controller is configured with data keys of respective non-CXL memory regions. For example, a second key memory unit of the non-CXL memory controller saves the data keys of respective non-CXL memory regions; the non-CXL memory controller may determine the data key of the target non-CXL memory region from the second key memory unit; thereby, when performing data reading on the target non-CXL memory region, the data key of the target non-CXL memory region is used to decrypt the data read; and when writing the write data to the target non-CXL memory region, the data key of the target non-CXL memory region is used to encrypt the write data, and the write data encrypted is saved to the target non-CXL memory region. The target non-CXL memory region may be regarded as a non-CXL memory region targeted by the data processing request, depending on the request address carried by the data processing request. For relevant introductions in the case of the data read request and data write request, please refer to the corresponding part of the preceding section and will not be expanded herein.

The embodiments of the present disclosure further provide a computer system, in an optional implementation, in conjunction with FIG. 3, the computer system may include a key manager, and the key manager includes a master control unit, a first algorithm engine, and a random number engine.

The master control unit is configured to: determine a plurality of memory regions that need to be encrypted and protected in a memory and a memory protocol of each memory region, in which the plurality of memory regions include at least one CXL memory region based on a CXL memory protocol; determine, for each CXL memory region, a device identification and address information of the CXL memory region; generate protection key generation information of the CXL memory region according to the device identification and the address information of the CXL memory region; invoke the first algorithm engine to generate a protection key of the CXL memory region according to a system root key predetermined and the protection key generation information of the CXL memory region;

invoke, for each CXL memory region, the random number engine to generate a random number of the CXL memory region; and generate a data key of the CXL memory region according to the random number of the CXL memory region, in which the data key of the CXL memory region is used for encrypting and decrypting data of the CXL memory region, and the protection key of the CXL memory region is used for encrypting and protecting the data key of the CXL memory region.

The random number engine is configured to, invoked by the master control unit, generate a random number for each CXL memory region.

The first algorithm engine is configured to, invoked by the master control unit, to process a result of splicing the system root key and the protection key generation information of the CXL memory region by a hash algorithm to obtain the protection key of the CXL memory region.

In some further embodiments, the plurality of memory regions further include at least one non-CXL memory region based on a non-CXL memory protocol.

The master control unit is further configured to: determine, for each non-CXL memory region, a region identification and address information of the non-CXL memory region; generate protection key generation information of the non-CXL memory region according to the region identification and the address information of the non-CXL memory region; invoke the first algorithm engine to generate a protection key of the non-CXL memory region according to the system root key and the protection key generation information of the non-CXL memory region;

invoke, for each non-CXL memory region, the random number engine to generate a random number for the non-CXL memory region; and generate a data key of the non-CXL memory region based on the random number of the non-CXL memory region, in which the data key of the non-CXL memory region is used for encrypting and decrypting data of the non-CXL memory region, and the protection key of the non-CXL memory region is used for encrypting and protecting the data key of the non-CXL memory region.

The random number engine is further configured to, invoked by the master control unit, generate a random number for each non-CXL memory region.

The first algorithm engine is further configured to, invoked by the master control unit, to process a result of splicing the system root key and the protection key generation information of the non-CXL memory region by a hash algorithm to obtain the protection key of the non-CXL memory region.

In some further embodiments, the master control unit is further configured to: distribute a data key of a memory region to a memory controller corresponding to the memory region when the computer system is in a low power consumption state; and write a data key ciphertext encrypted with the data key of the memory region and integrity check information into a system space mapped to the memory region.

The first algorithm engine is further configured to, invoked by the master control unit, to process a result of splicing the data key ciphertext and the protection key of the memory region by a hash algorithm to obtain the integrity check information.

In some embodiments, one memory region maps one system space, and different memory regions map different system spaces.

The master control unit is configured to determine a memory offset address of the data key ciphertext according to the protection key of the memory region, and the memory offset address of the data key ciphertext is used to determine the system space mapped to the memory region.

The first algorithm engine is further configured to, invoked by the master control unit, to process a result of splicing the protection key of the memory region and a copied protection key by a hash algorithm to obtain an intermediate offset address, and the intermediate offset address is used to determine the memory offset address of the data key ciphertext.

In some further embodiments, the key manager further includes a second algorithm engine, and the second algorithm engine is configured to, invoked by the master control unit, encrypt the data key of the memory region according to the protection key of the memory region to obtain the data key ciphertext of the memory region.

In some further embodiments, the master control unit is further configured to: invoke the first algorithm engine to regenerate a protection key of the memory region when the computer system is in a working state; read a data key ciphertext and integrity check information of the memory region from the system space mapped to the memory region; invoke the first algorithm engine to redetermine integrity check information according to the protection key regenerated of the memory region and the data key ciphertext read; compare the integrity check information redetermined with the integrity check information read; if a result of the compare is consistent, decrypt the data key ciphertext read according to the protection key regenerated of the memory region to obtain a data key of the memory region; and distribute the data key of the memory region to a memory controller corresponding to the memory region.

In some further embodiments, the computer system further includes a CXL memory controller, and the CXL memory controller includes a first security management unit, a first key memory unit, a first encryption engine unit, and a first memory protocol unit.

The first key memory unit saves a data key of each CXL memory region.

The first security management unit is configured to: acquire a data processing request, in which the data processing request indicates that data processing is performed on a target CXL memory region; determine a data key of the target CXL memory region from a data key of each CXL memory region stored in the first key memory unit; and invoke the first encryption engine unit to process data in the target CXL memory region according to the data key determined.

The first encryption engine unit is configured to, invoked by the first security management unit, encrypt and decrypt data in the CXL memory region according to the data key of the CXL memory region.

The first memory protocol unit is configured to implement a CXL memory protocol.

In some further embodiments, the CXL memory controller further includes a first address mapping unit configured to map a system space for each CXL memory region, one CXL memory region maps one system space, and different CXL memory regions map different system spaces.

In some further embodiments, the computer system further includes a non-CXL memory controller, and the non-CXL memory controller includes a second security management unit, a second key memory unit, a second encryption engine unit, a second memory protocol unit, and a second address mapping unit.

The second key memory unit saves a data key for each non-CXL memory region.

The second security management unit is configured to: acquire a data processing request, in which the data processing request indicates that data processing is performed on a target non-CXL memory region; determine a data key of the target non-CXL memory region from a data key of each non-CXL memory region stored in the second key memory unit; and invoke the second encryption engine unit to process data in the target non-CXL memory region according to the data key determined.

The second encryption engine unit is configured to, invoked by the second security management unit, encrypt and decrypt data in the non-CXL memory region according to the data key of the non-CXL memory region.

The second memory protocol unit is configured to implement a non-CXL memory protocol.

The second address mapping unit is configured to map a system space for each non-CXL memory region, one non-CXL memory region maps one system space, and different non-CXL memory regions map different system spaces.

The embodiments of the present disclosure further provide a chip, and the chip may include the computer system provided above in the embodiments of the present disclosure.

The embodiments of the present disclosure further provide a computer device, such as a terminal device or a server device, and the computer device may include the chip provided above in the embodiments of the present disclosure.

The above describes a plurality of embodiments provided by the embodiments of the present disclosure. The optional methods introduced in the embodiments may be combined and cross-referenced with each other without conflict, thus extending a variety of possible embodiments, which may be considered as disclosed embodiments of the present disclosure.

Although the embodiments of the present disclosure are disclosed as above, the present disclosure is not limited thereto. Any person skilled in the art may make various changes and modifications without departing from the spirit and scope of the present disclosure, and therefore the scope of protection of the present disclosure shall be subject to the scope limited by the claims.

The invention claimed is:

1. A key management method, applied to a key manager, the method comprising:
determining a plurality of memory regions that need to be encrypted and protected in a memory and a memory protocol of each memory region of the plurality of memory regions, wherein the plurality of memory regions comprise at least one Compute Express Link (CXL) memory region based on a CXL memory protocol;
determining, for a CXL memory region of the at least one CXL memory region, a device identification of the CXL memory region and an address information of the CXL memory region;
generating protection key generation information of the CXL memory region based on to the device identification and the address information of the CXL memory region;
generating a protection key of the CXL memory region based on a predetermined system root key and the protection key generation information of the CXL memory region, wherein generating the protection key of the CXL memory region comprises processing a result of splicing the system root key and the protection key generation information of the CXL memory region by a hash algorithm,
wherein the protection key of the CXL memory region is used for encrypting and protecting a data key of the CXL memory region, and the data key of the CXL memory region is used for encrypting and decrypting data of the CXL memory region.

2. The method according to claim 1, wherein the device identification of the CXL memory region comprises a device number of the CXL memory region, and determining the device identification of the CXL memory region comprises:
determining a bus ID, a device ID, and a function ID of the CXL memory region; and
splicing the bus ID, the device ID, and the function ID of the CXL memory region, wherein a result of the splicing is used as the device number of the CXL memory region.

3. The method according to claim 1, wherein the address information of the CXL memory region comprises a start address and an end address of the CXL memory region, and generating the protection key generation information of the CXL memory region according to the device identification and the address information of the CXL memory region, comprises:
splicing the start address and the end address of the CXL memory region with the device identification of the CXL memory region to generate the protection key generation information of the CXL memory region.

4. The method according to claim 1, wherein
the plurality of memory regions further comprise at least one non-CXL memory region based on a non-CXL memory protocol, and
the method further comprises:
determining, for each non-CXL memory region, a region identification and address information of the non-CXL memory region;
generating protection key generation information of the non-CXL memory region according to the region identification and the address information of the non-CXL memory region;
generating a protection key of the non-CXL memory region according to the system root key and the protection key generation information of the non-CXL memory region,
wherein the protection key of the non-CXL memory region is used for encrypting and protecting a data key of the non-CXL memory region, and the data key of the non-CXL memory region is used for encrypting and decrypting data of the non-CXL memory region.

5. The method according to claim 4, further comprising:
generating, for each non-CXL memory region, a random number for the non-CXL memory region; and generating the data key of the non-CXL memory region based on the random number of the non-CXL memory region.

6. The method according to claim 1, further comprising:
distributing a data key of a memory region to a memory controller corresponding to the memory region when a computer system is in a low power consumption state;
encrypting the data key of the memory region according to a protection key of the memory region to obtain a data key ciphertext of the memory region;
determining integrity check information of the data key ciphertext of the memory region; and
writing the data key ciphertext and the integrity check information of the memory region into a system space mapped to the memory region.

7. The method according to claim 6, wherein
one memory region maps one system space, and different memory regions map different system spaces; and
the method further comprises:
determining a memory offset address of the data key ciphertext according to the protection key of the memory region,
wherein the memory offset address of the data key ciphertext is used to determine the system space mapped to the memory region.

8. The method according to claim 7, wherein
determining the memory offset address of the data key ciphertext according to the protection key of the memory region, comprises:
copying the protection key of the memory region, splicing the protection key of the memory region with the copied protection key, and determining an intermediate offset address according to a result of the splicing; and
determining the memory offset address of the data key ciphertext according to the intermediate offset address and a size of an address space of the memory region,
wherein a start address of the system space mapped to the memory region is determined according to the memory offset address of the data key ciphertext and a start address of the memory region, and a size of the system space mapped to the memory region is a specified size.

9. The method according to claim 6, wherein each memory region maps to a unified system space.

10. The method according to claim 6, wherein determining the integrity check information of the data key ciphertext of the memory region, comprises:
determining the integrity check information of the data key ciphertext according to the data key ciphertext and the protection key of the memory region.

11. The method according to claim 10, wherein determining the integrity check information for the data key ciphertext according to the data key ciphertext and the protection key of the memory region, comprises:
splicing the data key ciphertext and the protection key of the memory region, processing a result of the splicing by a hash algorithm, and
using a hash value obtained as the integrity check information of the data key ciphertext.

12. The method according to claim 6, further comprising:
regenerating a protection key of the memory region when the computer system is in a working state;
reading the data key ciphertext and integrity check information of the memory region from the system space mapped to the memory region;
redetermining integrity check information according to the protection key regenerated of the memory region and the data key ciphertext which has been read;
comparing the integrity check information redetermined with the integrity check information read;
when a result of the comparing is consistent, decrypting the data key ciphertext read according to the protection key regenerated of the memory region to obtain the data key of the memory region; and
distributing the data key of the memory region to a memory controller corresponding to the memory region.

13. The method according to claim 12, wherein
for a CXL memory region, a memory controller corresponding to the CXL memory region is a CXL memory controller;
for a non-CXL memory region, a memory controller corresponding to the non-CXL memory region is a non-CXL memory controller; and
distributing the data key of the memory region to the memory controller corresponding to the memory region, comprises:
   distributing the data key of the CXL memory region to the CXL memory controller, and
   distributing the data key of the non-CXL memory region to the non-CXL memory controller.

14. The method according to claim 1, further comprising:
generating, for each CXL memory region, a random number for the CXL memory region; and generating the data key of the CXL memory region according to the random number of the CXL memory region.

15. A computer system, comprising a key manager, wherein:
the key manager comprises a master control unit, and a first algorithm engine;
the master control unit is configured to:
   determine a plurality of memory regions that need to be encrypted and protected in a memory and a memory protocol of each memory region of the plurality of memory regions, wherein the plurality of memory regions comprise at least one Compute Express Link (CXL) memory region based on a CXL memory protocol;
   determine, for a CXL memory region of the at least one CXL memory region, a device identification of the CXL memory region and an address information of the CXL memory region;
   generate protection key generation information of the CXL memory region based on to the device identification and the address information of the CXL memory region;
   invoke the first algorithm engine to generate a protection key of the CXL memory region based on a predetermined system root key and the protection key generation information of the CXL memory region;
   invoke the first algorithm engine to process a result of splicing the system root key and the protection key generation information of the CXL memory region by a hash algorithm to obtain the protection key of the CXL memory region;
wherein the protection key of the CXL memory region is for use for encrypting and protecting a data key of the CXL memory region, and the data key of the CXL memory region is for use in encrypting and decrypting data of the CXL memory region.

16. The computer system according to claim 15, further comprising a random number engine, and wherein:
the master control unit is further configured to:
   for each CXL memory region of the at least one CXL memory region,
      invoke the random number engine to generate a random number of the CXL memory region; and
      generate a data key of the CXL memory region according to the random number of the CXL memory region,
   wherein the data key of the CXL memory region is used for encrypting and decrypting data of the CXL memory region, and the protection key of the CXL memory region is used for encrypting and protecting the data key of the CXL memory region; and
the random number engine is configured to, invoked by the master control unit, generate a random number for each CXL memory region of the at least one CXL memory region.

17. A chip, comprising a key manager, wherein:
the key manager comprises a master control unit, and a first algorithm engine;
the master control unit is configured to:
   determine a plurality of memory regions that need to be encrypted and protected in a memory and a memory protocol of each memory region of the plurality of memory regions, wherein the plurality of memory regions comprise at least one Compute Express Link (CXL) memory region based on a CXL memory protocol,
   determine, for a CXL memory region of the at least one CXL memory region, a device identification of the CXL memory region and an address information of the CXL memory region;
   generate protection key generation information of the CXL memory region based on the device identification and the address information of the CXL memory region,
   invoke the first algorithm engine to generate a protection key of the CXL memory region based on a predetermined system root key and the protection key generation information of the CXL memory region, and
   invoke the first algorithm engine to process a result of splicing the system root key and the protection key generation information of the CXL memory region by a hash algorithm to obtain the protection key of the CXL memory region, and
wherein the protection key of the CXL memory region is for use for encrypting and protecting a data key of the CXL memory region, and the data key of the CXL memory region is for use in encrypting and decrypting data of the CXL memory region.

* * * * *